United States Patent
Bovi et al.

(10) Patent No.: US 11,703,420 B2
(45) Date of Patent: Jul. 18, 2023

(54) METHOD OF DETERMINING ACCELERATION OF A CRANKSHAFT

(71) Applicant: BorgWarner Luxembourg Automotive Systems SA, Bascharage (LU)

(72) Inventors: Philippe Bovi, Havange (FR); Bart Schreurs, Waltzing (BE); Michel Peters, Luxembourg (LU)

(73) Assignee: DELPHI AUTOMOTIVE SYSTEMS LUXEMBOURG SA, Bascharage (LU)

( * ) Notice: Subject to any disclaimer, the term of this patent is extended or adjusted under 35 U.S.C. 154(b) by 70 days.

(21) Appl. No.: 17/617,148

(22) PCT Filed: Oct. 1, 2020

(86) PCT No.: PCT/EP2020/077557
§ 371 (c)(1),
(2) Date: Dec. 7, 2021

(87) PCT Pub. No.: WO2021/078491
PCT Pub. Date: Apr. 29, 2021

(65) Prior Publication Data
US 2022/0236143 A1    Jul. 28, 2022

(30) Foreign Application Priority Data
Oct. 24, 2019    (GB) ..................... 1915408

(51) Int. Cl.
*G01M 15/11*    (2006.01)
*G01M 15/06*    (2006.01)

(52) U.S. Cl.
CPC ............ *G01M 15/11* (2013.01); *G01M 15/06* (2013.01)

(58) Field of Classification Search
CPC ............................... G01M 15/06; G01M 15/11
See application file for complete search history.

(56) References Cited

U.S. PATENT DOCUMENTS

| | | | |
|---|---|---|---|
| 4,697,561 A | 10/1987 | Citron | |
| 5,331,848 A * | 7/1994 | Nakagawa | G01M 15/11 73/114.05 |

(Continued)

FOREIGN PATENT DOCUMENTS

| | | |
|---|---|---|
| EP | 3450735 A1 | 3/2019 |
| GB | 2213946 A | 8/1989 |
| JP | H07229815 A | 8/1995 |

OTHER PUBLICATIONS

International Search Report dated Dec. 17, 2020 in International Application No. PCT/EP2020/077557 (3 pages).

*Primary Examiner* — Eric S. McCall
(74) *Attorney, Agent, or Firm* — Joshua M. Haines; Bookoff McAndrews, PLLC

(57) ABSTRACT

A method of determining the acceleration of a crankshaft of an internal combustion engine including one or more cylinders, with respect to each combustion event, n, among a plurality of combustion events, includes a) providing a signal indicative of crankshaft speed, with the signal including a series of minima and maxima speeds with respect to each successive combustion event and b) determining the acceleration of the crankshaft of the internal combustion engine with respect to each combustion event, n, among the plurality of combustion events, based on an initial speed value of a minima, Min (n) just before the combustion event, n, and a subsequent speed value of a maximum, Max (n) immediately subsequent to the combustion event, n, in addition to a speed of a minima for a subsequent combustion event, Min (n+1).

6 Claims, 3 Drawing Sheets

(56) References Cited

U.S. PATENT DOCUMENTS

| | | | |
|---|---|---|---|
| 6,070,567 A * | 6/2000 | Kakizaki | F02D 41/1498 123/436 |
| 2005/0241376 A1 | 11/2005 | Miyata et al. | |
| 2007/0021903 A1 * | 1/2007 | Christen | F02D 35/023 701/111 |
| 2008/0250850 A1 * | 10/2008 | Lynch | G01M 15/11 702/33 |
| 2014/0299080 A1 * | 10/2014 | Zouboff | F02D 41/009 123/90.15 |
| 2020/0386180 A1 * | 12/2020 | Kiwan | F02P 5/15 |
| 2022/0236143 A1 * | 7/2022 | Bovi | G01M 15/11 |

* cited by examiner

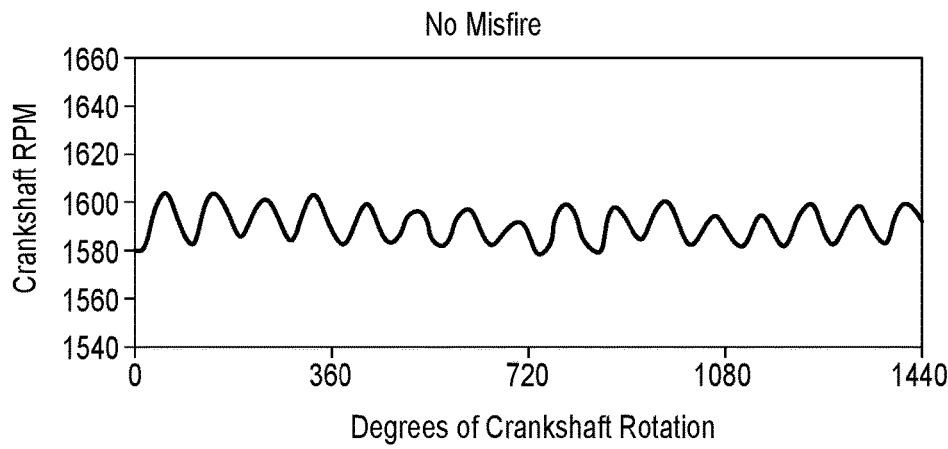
Fig. 1a
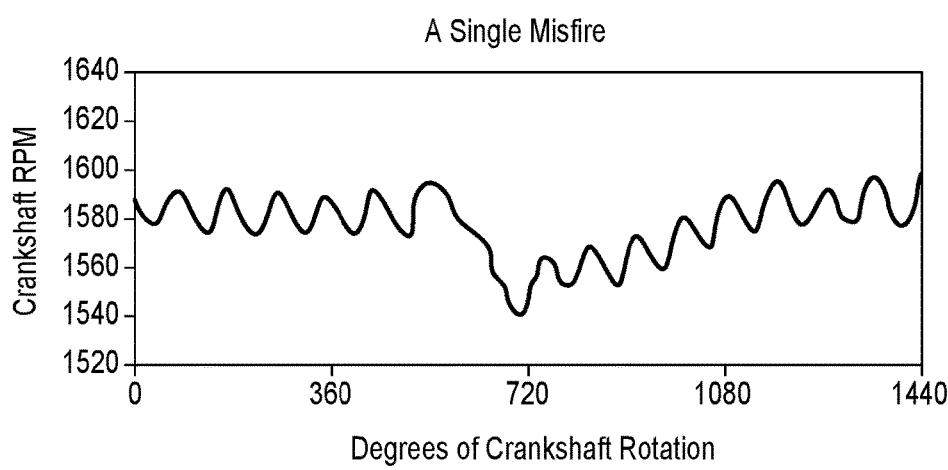
Fig. 1b
Fig. 2
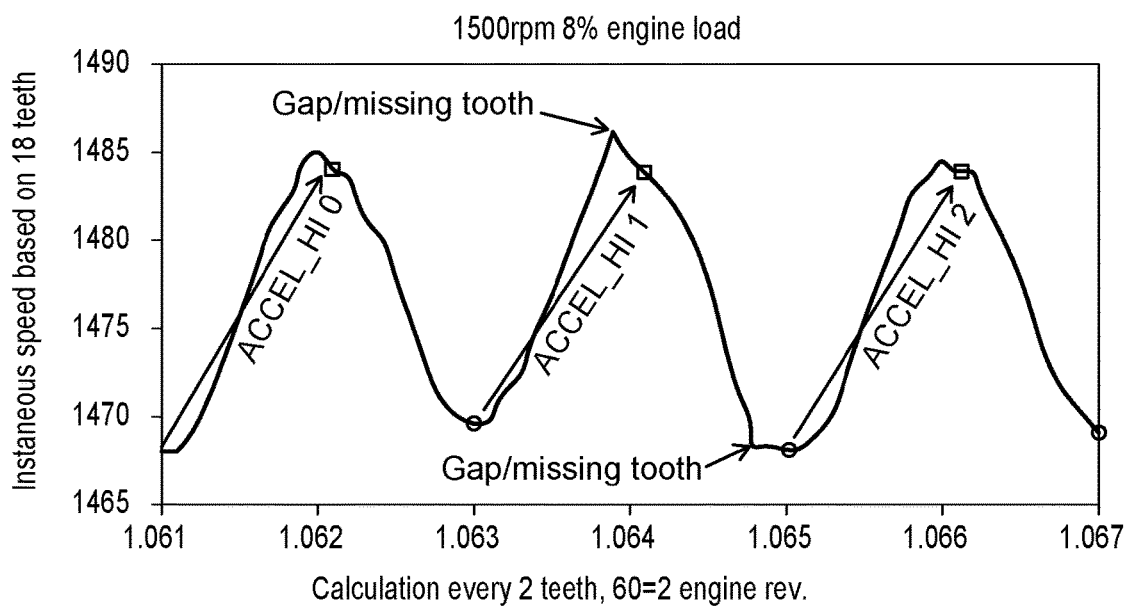

METHOD OF DETERMINING ACCELERATION OF A CRANKSHAFT

CROSS-REFERENCE TO RELATED APPLICATION(S)

This application is a National Stage under 35 U.S.C. § 371 of International Application No. PCT/EP2020/077557, filed Oct. 1, 2020, which claims priority to British Patent Application No. 1915408.7, filed Oct. 24, 2019, the contents of all of which are incorporated by reference in their entirety.

TECHNICAL FIELD

This relates to an improved method of determining crankshaft acceleration from crankshaft velocity measurements. It has particular but not exclusive application to accurately determining misfire events.

BACKGROUND OF THE INVENTION

In vehicles, it is a legal requirement as part of On-Board Diagnostic processes, to detect misfire of an internal combustion engine.

A common way to detect misfire events is to analyse the signal from the crankshaft angular position sensor which gives a signal of crankshaft speed. Indeed the crankshaft angular velocity fluctuations and/or successive acceleration measurements/timeline can be used to identify proper combustion events and misfire events.

In the technical publication SAE 2015-01-0210, a method of calculating crankshaft angular acceleration is explained. The calculated crankshaft angular acceleration is either compared to a map-based threshold or compared to a modeled acceleration to calculate a misfire detection metric. In both cases, the detection threshold depends on the estimated air charge per cylinder or on the estimated torque. Using the estimated torque to define the detection threshold may result in a lack of detection performance, especially for low torque, due to modelling error, due to engine deviations or due to specific operating conditions.

The Instantaneous Crankshaft Acceleration principle has been reused to design a new misfire detection strategy capable of good detection performance on the full engine operating range, especially for small displacement 3 cylinder gasoline engine.

The overall behavior of the strategy was good but detection issues have been observed in specific operating conditions: transmission speed variations at low engine speed, speed oscillations at high engine speed and low load.

It is an object of the invention to provide an improved methodology

SUMMARY OF THE INVENTION

In one aspect is provided A method of determining the instantaneous acceleration of an internal combustion engine comprising one or more cylinders, with respect to a combustion event, n, comprising:

a) providing a signal indicative of crankshaft speed, said signal comprising a series of minima and maxima with respect to each successive combustion event;

b) determining the accelerations based on: the initial speed value of the minima, Min(n) just before the combustion event, n, and the subsequent speed value of the maximum immediately subsequent to the combustion event, Max (n), as well as the speed of the minima for the subsequent combustion event, Min (n+1).

In step b) the instantaneous acceleration for a combustion event n, ($Acc_n$) acceleration may be based on the following equation:

$$Acc_n = (\text{Speed Max } n - (a*\text{Speed Min}(n+1) + b*\text{Speed Min } n/(a+b))/t_{int}$$

where Speed Min n is the initial speed at the minima, Min(n) just before the combustion event, n, and Speed Max n is the speed at the subsequent maximum Max (n) immediately subsequent to the combustion event, and Speed Min (n+1) is the minima speed for the subsequent combustion event, Min (n+1)

and a, and b are factors that can be calibrated in a map function of the engine speed and engine brake torque; and $t_{int}$ is the time between the maxima (Max(n)) and the preceding minima (Min (n)) or the general time between Min (n) and Max (n);

The instantaneous acceleration my be additionally based on additionally the minima value of the previous combustion event n−1.

The instantaneous acceleration for a combustion event n, ($Acc_n$) acceleration may be based on the following formula:

$$Accn = (\text{Speed Max } n - (a*\text{Speed Min}(n+1) + b*\text{Speed Min} + c*\text{Min Speed}) \\ (n-1)/(a+b+c))/\text{tint}$$

where Speed min (n−1) is the minima speed of the combustion event preceding combustion event n.

a, b and c are factors that can be calibrated in a map function of the engine speed and engine brake torque; and $t_{int}$ is the time between the maxima (Max(n)) and the preceding minima (Min (n)) or the general time between Min (n) and Max (n).

In a further aspect is provided a method to detect misfire events by analyzing one or more of acceleration determinations as computed from the above methods.

BRIEF DESCRIPTION OF THE DRAWINGS

The present invention is now described by way of example with reference to the accompanying drawings in which:

FIGS. 1 a and b shows the engine speed signal of a V8 engine without misfire and with a single misfire respectively;

FIG. 2 shows the engine speed signal with a 3 cylinder engine; representation of the acceleration calculated for each cylinder

DESCRIPTION OF THE PREFERRED EMBODIMENTS

FIGS. 1 a and b shows the engine speed signal of a V8 engine without misfire and with a single misfire respectively;

FIG. 2 shows the engine speed signal with a 3 cylinder engine; representation of the acceleration calculated for each cylinder.

Prior Art

The crankshaft signal can be used in general to determine an instantaneous acceleration with respect to each cylinder consequent to combustion. Generally for a combustion event, the crankshaft speed at a local minimum is determined (prior to ignition/combustion event) and the crankshaft speed at a local maximum is determined immediately subsequent to the combustion event. The acceleration is determined from the two measurements and the time between the measurement. This captures the effects of the spark, ignition of the fuel air mixture.

Figure 3A:
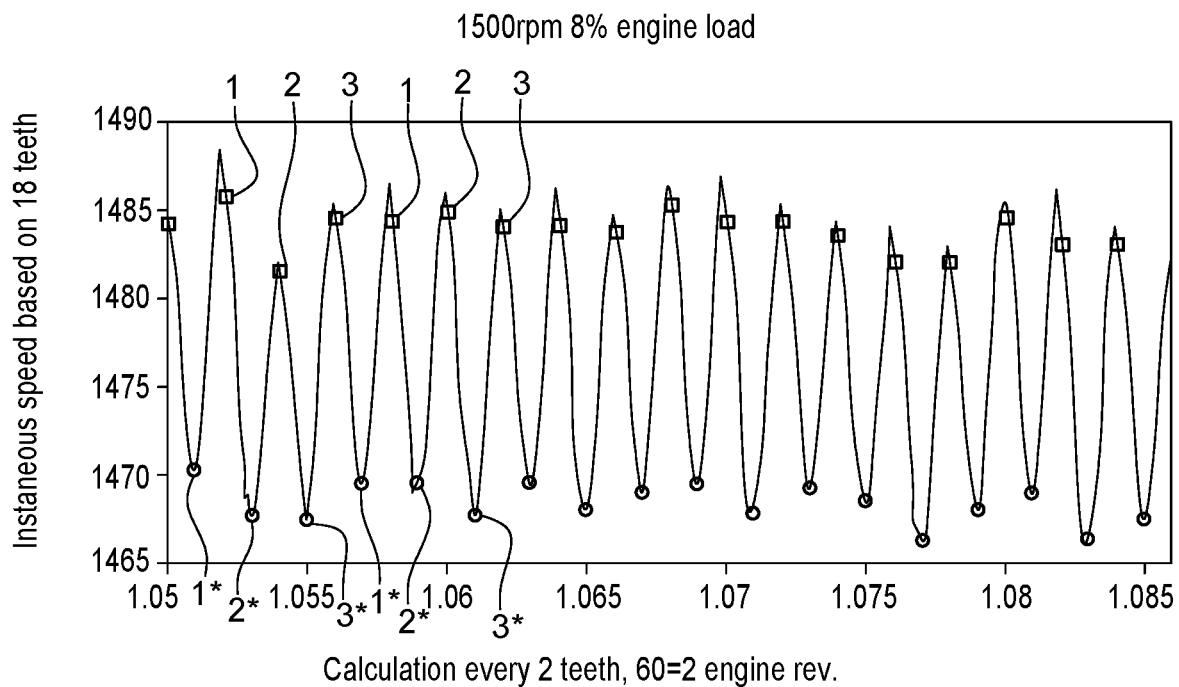
FIG. 3a shows a plot of the instantaneous engine speed for 3-cylinder engine (determined from the crankshaft signal) against crankshaft position.

FIG. 3a shows a plot of the instantaneous engine speed for 3-cylinder engine (determined from the crankshaft signal) against crankshaft position. The X axis is the crankshaft position, incremented by 1 every second tooth so 60=2 engine revolutions. Generally speaking the plot crankshaft position increases with time, time. Essentially the signal/plot is a crankshaft speed signal. The plot oscillates from low values (minima) to high values consequent (maxima) to combustion/firing event events. The plot shows a 3-cylinder engine with the cylinders #1 #2 and #3 firing consecutively. Points 1*, 2*, 3* show the minima of speed prior to firing in cylinders #1, #2, and #3 respectively, and points 1, 2, 3 show the maxima of speed consequent/subsequent to firing in cylinders #1, #2, and #3 respectively.

Figure 3B:
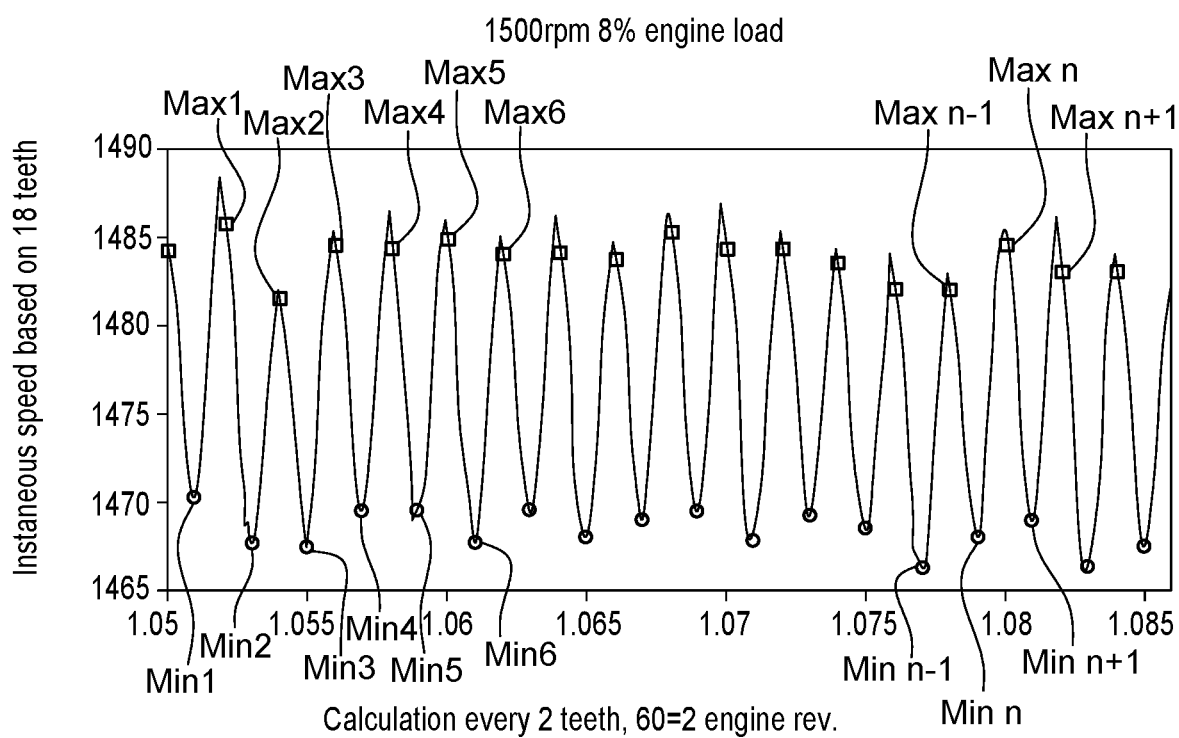
FIG. 3b shows the identical plot to FIG. 3b but with additional notations for clarity FIGS. 4a and 4 b shows two plots of detection based on the prior art method and one according to the invention respectively.

FIG. 3b shows the identical plot to FIG. 3a but with additional notations for clarity.

The plot can also be regarded as showing minima and maxima with respect to successive combustion events/firings #1, #2, #3, #4, #5, etc., generally designated #n where is a monotonically increasing integer. So the plot shows Min1 and Max 1 for in respect of minima and maxima immediately prior and subsequent to combustion event #1; Min 2 and Max 2 in respect of minima and maxima immediately prior and subsequent to combustion event #2, etc So with respect to each or a particular cylinder/firing event, the plot shows subsequent to firing of a cylinder/ignition, at each combustion event, the speed goes from a minima to a maxima.

The standard formula for determining the acceleration calculation with respect to a combustion event numbered #n is:

$$acc = (\text{speed Max}(n) - \text{speed Min}(n))/t_{int}$$

where speed Max(n) is the speed maxima following the combustion event n;

here speed Min(n) is the speed minima prior to the combustion event n;

and $t_{int}$ is the time between the maxima and the preceding minima

In other words, the acceleration is determined as the change in speed per time, the change in speed being the speed maximum minus the speed minimum with respect to the combustion event. To recap, the plot is marked with minima "Min1" and maxima (Max1) for combustion event #1, minima "Min2" maxima "Max2" for combustion event #; minima "Min3" and maxima "Max3" for combustion event #3; minima "Min4" maxima "Max4" for combustion event #4, etc. The combustion event can be regarded as combustion event "n" comprising adjacent contiguous combustion events—preceding combustion event n−1, and subsequent combustion event n+1. The formula can be used for any number of cylinders Invention According to the example of the invention the formula for the acceleration calculation for each combustion event n is based on the initial speed (minima), Min(n) just before the combustion event, n, and subsequent maximum consequent and immediately subsequent to the combustion event, Max (n), as well as the minima speed for the subsequent combustion event, Min (n+1)

In one example in simpler embodiments the formula for determining the acceleration is:

$$Acc = (\text{Speed Max } n - (a*\text{Speed Min}(n+1) + b*\text{Speed Min } n/(a+b))/t_{int} \quad \text{(formula 1)}$$

Where Speed Min n is the initial speed at the minima, Min(n) just before the combustion event, n, and Speed Max n is the speed at the subsequent maximum Max (n) immediately subsequent to the combustion event, and Speed Min (n+1) is the minima speed for the subsequent combustion event, Min (n+1)

a, b are factors that can be calibrated in a map function of the engine speed and engine brake torque; and the $t_{int}$ is the general time between Min (n) and Max (n).

$t_{int}$ is the time between the maxima and the preceding minima

Thus the formula could be regarded as determining acceleration based on an initial speed which is based on the average of the current minima value and the subsequent minima value In advanced embodiments the acceleration may be based on additionally the minima value of the previous combustion event n−1. So in such an example the acceleration may be based on the following formula:

$$Acc = \quad \text{(formula 2)}$$
$$(\text{Speed Max } n - (a*\text{Speed Min}(n+1) + b*\text{Speed Min } n + c*\text{Speed Min}(n-1)/(a+b+c))/t_{int}$$

a, b and c are factors that can be calibrated in a map function of the engine speed and engine brake torque; and the $t_{int}$ is the general time between Min (n) and Max (n).

Where Speed Min n is the initial speed at the minima, Min(n) just before the combustion event, n, and Speed Max n is the speed at the subsequent maximum Max (n) immediately subsequent to the combustion event, and Speed Min (n+1) is the minima speed for the subsequent combustion event, Min (n+1), and Speed min (n−1) is the minima speed preceding the preceding combustion event n−1.

a, b and c are factors that can be calibrated in a map function of the engine speed and engine brake torque; and the $t_{int}$ is the general time between Min (n) and Max (n).

So in the example the acceleration for the combustion event #4 is

Speed Max4 −

$$(a*\text{Speed Min5} + b*\text{Speed Min4} + c*\text{Speed Min3}/(a+b+c))/t_{int}$$

a, b and c are factors that can be calibrated in a map function of the engine speed and engine brake torque. Indeed, different averaging factors are necessary to obtain a better detection performance depending on the engine operating conditions.

Thus the formula could be regarded as determining acceleration based on an initial speed which is based on the average of the current minima value and the previous and subsequent two minima values, allows improvement of the accuracy of the acceleration result in case of transient conditions (shaft acceleration or deceleration not induced by the combustion events).

Figure 4A:
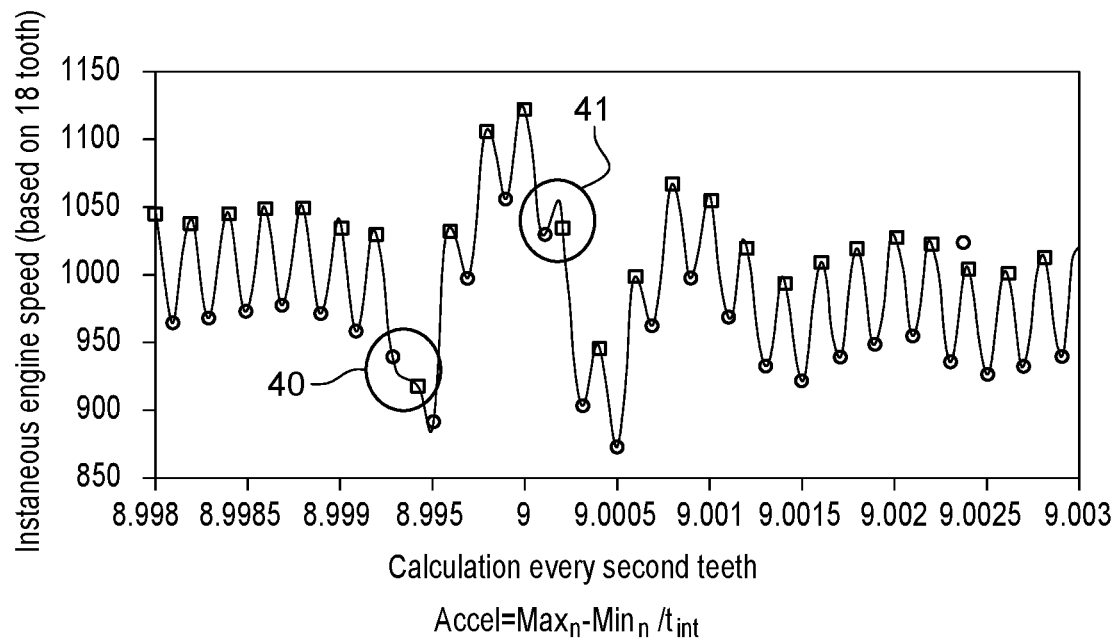
Figure 4B:
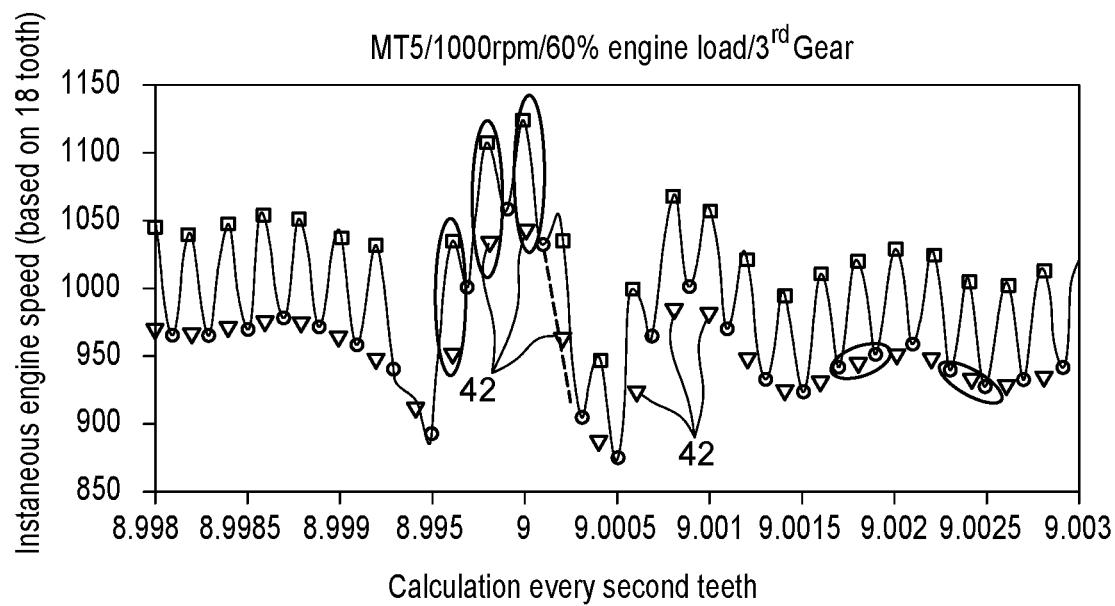

FIGS. 4a and 4b shows two plots of detection based on the prior art method and one according to the invention respectively.

FIG. 4a shows a plot of measured speed form the crankshaft signal showing successive minima and maxima with respect to successive combustion events. It shows regions where a real misfire circled as 40 is determined and where a false detection of misfire 41 can be determined due to decreasing speed.

The example of false detection at low engine speed due to transmission speed variation in FIG. 4a is solved by averaging current and next two minima speed values according to formula 2: here a=0.5, b=0.5, c=0. FIG. 4b shows the same plot of measured crankshaft speed as FIG. 4a. Reference 42 shows the average speed calculated with formula 2 which has a damping effect when used to determine acceleration with respect to false determination of misfire.

At high engine speed and low engine load, depending on the transmission, oscillations of the crankshaft engine speed have been observed which prevent the robust detection of misfire events. These high frequency oscillations (probably induced by the use of a dual mass flywheel) are generating large noise on the acceleration signal with or without misfire.

When calculating the average of previous, current and next "Speed Min" values, the amplitude of the engine speed oscillations is reduced and a robust detection can be obtained at a lower engine load compared to the standard acceleration calculation using only the current "Speed min" value.

Misfire events can be determined from one or more values of (instantaneous) accelerations determined form the above methodology. Various method would be understood by the skilled person such as comparing the value of instantaneous acceleration with a threshold. Preferably the value of instantaneous acceleration of one combustion event is compared with one or more values of previous and/or subsequent combustion events. The values of one or more values of previous and/or subsequent combustion events may be averaged, and the comparison made. The difference may be compared to a threshold and misfire detected if said difference is greater than said threshold.

The invention claimed is:

1. A method of determining the acceleration of a crankshaft of an internal combustion engine comprising one or more cylinders, with respect to each combustion event, n, among a plurality of combustion events, comprising:
   a) providing a signal indicative of crankshaft speed, said signal comprising a series of minima and maxima speeds with respect to each successive combustion event;
   b) determining the acceleration of the crankshaft of the internal combustion engine with respect to each combustion event, n, among the plurality of combustion events, based on: an initial speed value of a minima, Min_(n) just before the combustion event, n, and a subsequent speed value of a maximum, Max (n) immediately subsequent to the combustion event, n, as well as a speed of a minima for a subsequent combustion event, Min (n+1).

2. The method as claimed in claim 1, wherein the determination of the acceleration is used to detect misfire events of the internal combustion engine, the detection occurring based on a comparison of the determination of the acceleration with one or more threshold acceleration values corresponding to the subsequent combustion event.

3. The method as claimed in claim 1, wherein in step b) said acceleration for the combustion event n, (Acc-n-) acceleration is based on the following equation:

$$Acc_n = $$
$$(\text{Speed Max } n - (a*\text{Speed Min}(n+1) + b*\text{Speed Min } n/(a+b))/t_{int}$$

where Speed Min n is the initial speed at the minima, Min_(n) just before the combustion event, n, and Speed Max n is the speed at the subsequent maximum Max (n) immediately subsequent to the combustion event n, and Speed Min (n+1) is the minima speed for the subsequent combustion event, Min (n+1), and a and b are factors that can be calibrated in a map function of engine speed and engine brake torque; and $t_{int}$ is the time between the maxima (Max(n)) and the preceding minima (Min (n)).

4. The method as claimed in claim 3, wherein a equals 0.5 and b equals 0.5.

5. The method as claimed in claim 1, where said acceleration is additionally based on a minima speed value of a previous combustion event n−1.

6. The method as claimed in claim 5, wherein in said acceleration for the combustion event n, said (Acc$_n$-) acceleration is based on the following formula:

$$Acc_n = (\text{Speed Max } n - (a*\text{Speed Min}(n+1) +$$
$$b*\text{Speed Min } n + c*\text{Speed Min}(n-1)/(a+b+c))/t_{int},$$

where Speed Min (n−1) is the minima speed value of the previous combustion event n−1 preceding the combustion event n, and a, b, and c are factors that can be calibrated in a map function of engine speed and engine brake torque; and $t_{int}$ is the time between the maxima (Max_(n)) and the preceding minima (Min (n)).

* * * * *